March 2, 1926.

N. W. STORER ET AL 1,575,016

LOCOMOTIVE CAB FRAME AND TRUCK

Filed Sept. 19, 1922

2 Sheets-Sheet 1

WITNESSES:
H. B. Funk.
W. B. Jaspert.

INVENTORS
Norman W. Storer, and
Harold A. Houston.
BY
Chesley G. Carr
ATTORNEY

March 2, 1926.

N. W. STORER ET AL 1,575,016

LOCOMOTIVE CAB FRAME AND TRUCK

Filed Sept. 19, 1922  2 Sheets-Sheet 2

WITNESSES:
H. B. Funk
W. B. Jaspert.

INVENTORS
Norman W. Storer, and
Harold A. Houston.
BY
Wesley G. Carr
ATTORNEY

Patented Mar. 2, 1926.

1,575,016

UNITED STATES PATENT OFFICE.

NORMAN W. STORER, OF PITTSBURGH, AND HAROLD A. HOUSTON, OF WILKINSBURG, PENNSYLVANIA, ASSIGNORS TO WESTINGHOUSE ELECTRIC & MANUFACTURING COMPANY, A CORPORATION OF PENNSYLVANIA.

LOCOMOTIVE CAB FRAME AND TRUCK.

Application filed September 19, 1922. Serial No. 589,086.

*To all whom it may concern:*

Be it known that we, NORMAN W. STORER, a citizen of the United States, and a resident of Pittsburgh, in the county of Allegheny and State of Pennsylvania, and HAROLD A. HOUSTON, a citizen of the United States, and a resident of Wilkinsburg, in the county of Allegheny and State of Pennsylvania, have invented a new and useful Improvement in Locomotive Cab Frames and Trucks, of which the following is a specification.

Our invention relates to railway vehicles, and more specifically to the body and truck-frame structures of electric locomotives.

It is among the objects of this invention to provide certain improved details of construction in electric locomotives having two or more supporting trucks.

It is another object of this invention to provide an electric locomotive body and truck structure which shall be flexible with respect to the co-working parts and rigid in the main cab-frame support.

It is a further object of this invention to provide such a locomotive structure which shall be durable, mechanically efficient and of a well-balanced design.

Figure 1:
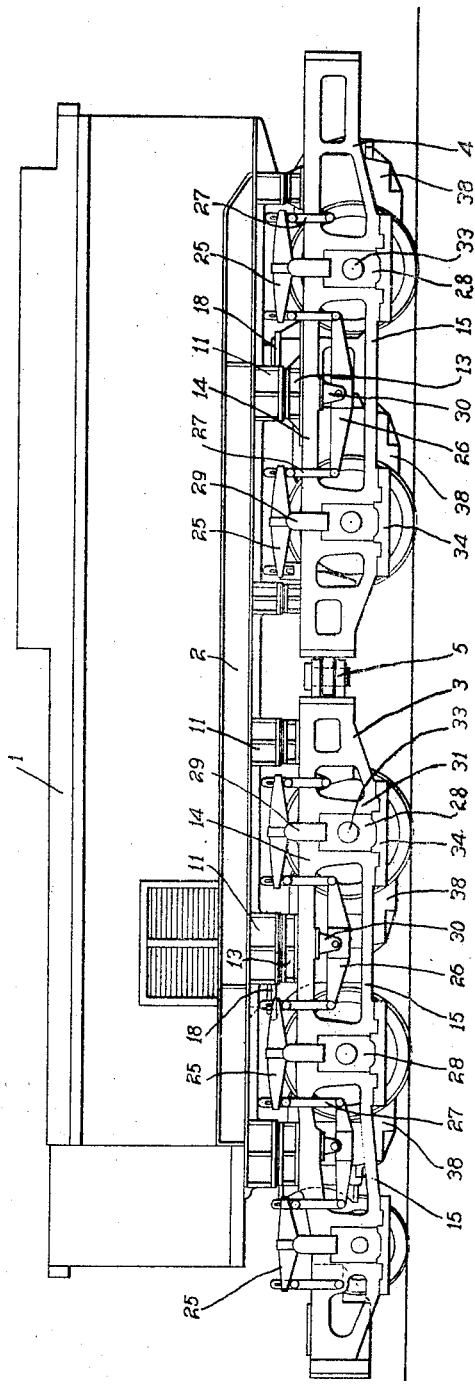
Figure 2:
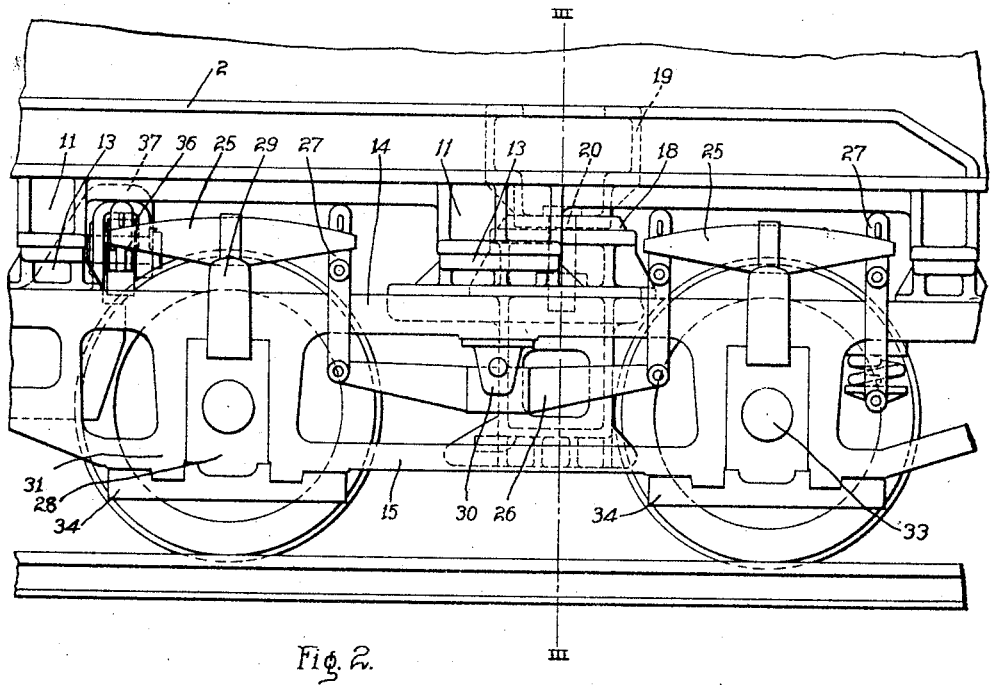
Figure 3:
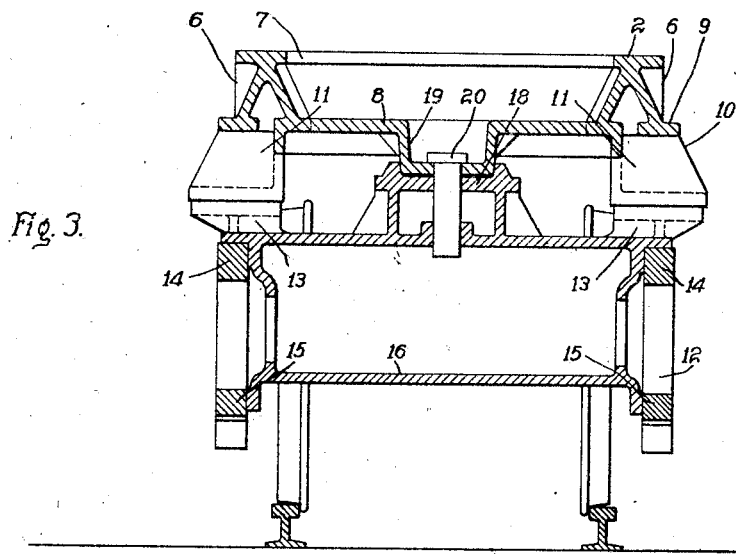

In the accompanying drawings constituting a part hereof and in which like reference characters designate like parts, Fig. 1 is a side elevational view of an electric locomotive embodying the principles of this invention;

Fig. 2 is a side elevational view of a fragmentary portion of the cab and truck supports, illustrating the center-bearing mounting, and Fig. 3 is a cross-sectional view thereof taken along the line III—III of Fig. 2.

Referring to Fig. 1, the electric locomotive comprises a cab or body portion 1 supported on a longitudinal under frame or bed 2 of integral construction which is pivotally mounted upon a plurality of trucks 3 and 4. The trucks are connected by a mallet hinge 5 to provide for articulation therebetween.

Referring to Fig. 3, the cab under frame 2 consists of a unitary casting having a pair of integrally cast longitudinal side-frame portions 6 that are recessed longitudinally to provide a light-weight structure and reinforced by a plurality of transverse tie-rods 7 and center-bearing plates 8 constituting an integral part thereof. The side portions 6 are provided with a plurality of transversely extending brackets 9 which support an aisle frame 10 and are integral with the body frame 2. A plurality of vertically depending, longitudinally spaced bearing blocks or pads 11 are formed integrally with the side portions 6 to provide side supports of a relatively large surface bearing with the truck frames 12, which are provided with correspondingly shaped bearing blocks 13 coactively engaging the bearings 11. The cab sub-structure framing comprising the frames, tie-rods, center-bearing plates, aisle frames and side-bearing pads comprise an integral casting.

The trucks are of the usual construction, comprising the side frames 12 having an upper rail 14 and a lower rail 15 secured by transverse tie-rods 16, some of which are provided with a center bearing 18, which are disposed in transverse alinement with the center plates 19 of the cab under frame 2. The truck members are pivotally connected to the cab under frame 2 by a center pin 20 passing through the center plates 18 and 19 to provide relative pivotal movement between the cab frame 2 and the respective trucks, and the center pin of the leading truck is mounted in a movable guide block to provide longitudinal movement thereof.

Referring to Figs. 1 and 2, the load distribution is effected by the center bearings 18 and 19, side bearings 11 and 13 and by a plurality of drive springs 25 connected to equalizer arms 26 by hanger straps 27 and supported on the driving boxes 28 by brackets 29. The drive-spring equalizer arms 26 are connected, by brackets 30, to the upper rail frame in proximity to the main side bearings 11 of the cab frame and substantially in alinement with the center bearing 18 of the truck.

Referring to Fig. 2, the front drive spring 25 is secured, at one end, on a cross equalizer beam 36 which is pivotally mounted on a bracket 37 secured to the center of a truck cross-tie on the front of the rear truck 4. A similar transverse or cross equalizer support is provided on the front or leading truck 3 to support the front drive spring 25. The side frames 12 of the trucks are provided with the usual pedestals 31 adapted to receive the journal or driving boxes 28 in which the driving wheel axles 33 are rotatably mounted. The driving boxes 28 are held in the pedestals 31 by cross straps or binders 34 secured to the lower rail 15 of the truck frame.

The trucks 3 and 4 are provided with a plurality of driving motors 38 which are tandem lounged and supported at one end on their respective driving axles 33.

The operation of the device is such that the static load is properly distributed over the center and side-bearing supports when the locomotive is stationary, and it is found that, by means of our form of side-bearing construction, this distribution of load is maintained even when the two trucks alter their relative positions with respect to the cab when running from a tangent to a curve, since the contact of the side-bearing members is maintained at all times. The freedom of articulation at the hinge connection 5 permits of relative pivotal movement of the two truck members with respect to the cab frame 2, and the front center pin is mounted in a longitudinally movable guide block to provide longitudinal movement of the cab and leading truck when cording a curve.

The cross equalizers 36 supporting the front drive springs 25 of the leading and trailing trucks 3 and 4, respectively, distribute the loading equally on the driving boxes on both sides of the trucks. The rear drive springs 25 are secured to the trucks and provide a two-point support for the cab under-frame 2. By maintaining a lubricated surface between the side-bearing members 11, a practically frictionless contact is provided which prevents undue stressing of the cab and truck frame and alteration of the load distribution. Lubrication between the bearing members 11 may be provided by suitable packing materials disposed in an oil well or reservoir in the bottom bearing members or in any suitable manner, as by grooving the wearing surfaces of the bearing pads 11 and 13.

In locomotives of previous types embodying the center-bearing support between the trucks and cab sub-frame, the load was concentrated on these center bearings which effected a weight transfer by reason of draw bar pull between the fore and aft truck supports and cab support. The side bearings 11 are designed to obviate the weight transfer by providing supports at the fore and aft portions of the trucks and along the cab sub-frame. This permits through equalization on each truck.

The tandem lounging of the motors 38 likewise eliminates weight transfer from their respective axle supports as the weight is on or off the driving axle supports of all motors simultaneously, depending on the direction of rotation.

From the above it is evident that the load is carried and distributed in such manner as to almost eliminate vertical stresses in the main truck frames. The load of and in the cab is transferred directly to the wheels and axles by the arrangement for receiving this load at the equalizer fulcrum point. Practically the only weight transferred is between the trucks such as occurs between the systems of equalization employed on rigid-frame locomotives.

Although the general details of the truck structure are common to electric and steam locomotives, attention is called to the fact that these, in combination with the novel types of movable bearing supports between the trucks and cab frame and the rigid construction of the cab frame which comprises an integral casting, are a distinct improvement over the prior art.

Although I have described a specific embodiment of my invention, it will be obvious to those skilled in the art that various modifications may be made therein. For instance, the center-bearing construction may be altered to permit of relative lateral movement between the trucks and the cab support.

The side bearings may be altered in general design to accommodate any particular conditions of operation or distribution of the load with respect to the cab and truck-frame structure and they may be provided with an oil-pressure lubricating system, such as are commonly employed in bearings of this type. The use of the longitudinally and pivotally movable front center bearing, the pivotal rear center bearing and sliding side bearings is not confined to the driving-spring-equalizer type of truck construction but may be employed in any suitable driving gear mechanism.

The embodiments of this invention may be employed on single and triple as well as double-truck types, especially on the three-truck construction where freedom of articulation between the truck members is essential. These and other changes may be made in the details of construction without departing from the principles herein set forth.

We claim as our invention:

1. The combination with a vehicle-body support, of a plurality of wheeled trucks, means for effecting relative lateral movement between said trucks and relative pivotal movement between said body support and the respective trucks, and means for effecting load distribution on said trucks over a relatively wide surface area, said first-named means comprising a mallet-hinge connection between said trucks and a plurality of center-bearing connections between said body support and said trucks, and said last-named means comprising a plurality of side-bearing supports longitudinally spaced along the body and truck side frames.

2. The combination with a vehicle-body support, of a plurality of wheeled trucks, means for providing lateral stability for said body support on the respective trucks, and means for effecting load distribution on said trucks over a relatively wide surface area, said body support comprising a unitary casting having cross-ties, center-bearing plates and side-bearing pads formed integrally therewith in operative engagement with coacting bearing members provided on the truck frames and bolsters.

3. The combination with a vehicle-body support, of a plurality of wheeled trucks, means for effecting relative lateral movement between said trucks and relative pivotal movement between said body support and the respective trucks, and means for effecting load distribution on said trucks and driving boxes over a relatively wide surface area, said first-named means comprising a mallet-hinge connection between said trucks and a plurality of center-bearing connections between said body support and said trucks, and said last-named means comprising a plurality of side-bearing supports longitudinally spaced along the body and truck side frames.

4. The combination with a vehicle-body support, of a plurality of wheeled trucks, and means for equalizing load distribution upon the frames of said trucks and upon the axles thereof, said means comprising a plurality of longitudinally spaced coacting side-bearing pads, some of which are in vertical alinement with longitudinal and transverse equalizer arms suspended from the drive springs supported on the driving boxes of said trucks.

5. The combination with a vehicle-body support, of a plurality of wheeled trucks, means for pivotally mounting said trucks on said body support, and means for equalizing load distribution upon the frames of said trucks and upon the axles thereof, said first-named means comprising a plurality of center-bearing plates formed integrally with said body support in co-operative alinement with corresponding truck center-bearing plates, and having a vertically disposed center pin passing through said body and truck center bearing, and said last-named means comprising a plurality of longitudinally spaced coacting side-bearing pads, some of which are in vertical alinement with equalizer arms suspended from the driving springs supported on the driving boxes of said trucks.

In testimony whereof, we have hereunto subscribed our names this 13th day of September, 1922.

NORMAN W. STORER.
HAROLD A. HOUSTON.